US008387038B2

(12) United States Patent
Wheeler et al.

(10) Patent No.: US 8,387,038 B2
(45) Date of Patent: Feb. 26, 2013

(54) METHOD AND SYSTEM FOR AUTOMATIC COMPUTER AND USER MIGRATION (75) Inventors: Gregory L. Wheeler, Metamora, IL (US); Steven Sheldon, Morton, IL (US); Gregg Purcell, East Peoria, IL (US); Greg Stone, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 1933 days.

(21) Appl. No.: 11/503,293

(22) Filed: Aug. 14, 2006

(65) Prior Publication Data
US 2008/0040714 A1 Feb. 14, 2008

(51) Int. Cl.
G06F 9/445 (2006.01)

(52) U.S. Cl. ........................................ 717/174; 717/176

(58) Field of Classification Search .................... None
See application file for complete search history.

(56) References Cited

U.S. PATENT DOCUMENTS

| 6,145,066 | A | 11/2000 | Atkin |
| 6,182,212 | B1 * | 1/2001 | Atkins et al. ........................ 713/1 |
| 6,546,404 | B1 * | 4/2003 | Davis et al. ............................ 1/1 |
| 6,662,357 | B1 * | 12/2003 | Bowman-Amuah .......... 717/120 |
| 6,711,676 | B1 | 3/2004 | Zomaya et al. |
| 6,728,877 | B2 * | 4/2004 | Mackin et al. ................. 713/100 |
| 6,735,691 | B1 * | 5/2004 | Capps et al. ...................... 713/1 |
| 6,889,376 | B1 * | 5/2005 | Barritz et al. ................. 717/175 |
| 6,920,555 | B1 * | 7/2005 | Peters et al. ................... 713/100 |
| 6,963,908 | B1 * | 11/2005 | Lynch et al. ................... 709/220 |
| 6,976,062 | B1 | 12/2005 | Denby et al. |
| 7,000,229 | B2 | 2/2006 | Gere |
| 7,028,079 | B2 * | 4/2006 | Mastrianni et al. ........... 709/217 |
| 7,089,553 | B1 * | 8/2006 | Glaser et al. ................... 717/178 |
| 7,210,131 | B2 * | 4/2007 | Schmidt et al. ............... 717/137 |
| 7,263,590 | B1 * | 8/2007 | Todd et al. ..................... 711/165 |
| 7,346,766 | B2 * | 3/2008 | Mackin et al. ................. 713/100 |
| 7,356,816 | B2 * | 4/2008 | Goodman et al. ............. 717/172 |
| 7,430,590 | B1 * | 9/2008 | Rive et al. ...................... 709/220 |
| 7,467,198 | B2 * | 12/2008 | Goodman et al. ............. 709/223 |
| 7,506,337 | B2 * | 3/2009 | Iyer ................................. 717/177 |
| 7,523,147 | B2 * | 4/2009 | Hicks et al. ...................... 705/28 |
| 7,614,050 | B2 * | 11/2009 | Sasaki et al. ................... 717/174 |
| 7,627,667 | B1 * | 12/2009 | Rive et al. ...................... 709/224 |
| 7,634,685 | B2 * | 12/2009 | Henrickson .................... 714/6.11 |
| 7,680,957 | B1 * | 3/2010 | Ketterhagen et al. ......... 709/246 |
| 7,703,142 | B1 * | 4/2010 | Wilson et al. ................... 726/26 |
| 7,707,007 | B2 * | 4/2010 | Campbell ....................... 702/182 |
| 7,707,115 | B2 * | 4/2010 | Goringe et al. ................. 705/59 |
| 7,710,912 | B1 * | 5/2010 | Myles et al. .................... 370/328 |
| 7,716,312 | B2 * | 5/2010 | Gamble ......................... 709/223 |
| 7,818,410 | B1 * | 10/2010 | Barnes et al. .................. 709/223 |
| 7,895,573 | B1 * | 2/2011 | Bhargava et al. .............. 717/120 |
| 7,913,250 | B2 * | 3/2011 | Baron et al. .................... 717/176 |
| 7,966,612 | B2 * | 6/2011 | D'Alterio et al. ............. 717/168 |
| 8,209,680 | B1 * | 6/2012 | Le et al. ......................... 717/174 |
| 8,224,784 | B2 * | 7/2012 | Henrickson .................... 707/654 |
| 2001/0052108 | A1 * | 12/2001 | Bowman-Amuah ............. 717/1 |
| 2002/0103996 | A1 | 8/2002 | Le Vasseur et al. |

(Continued)

Primary Examiner — Insun Kang
(74) Attorney, Agent, or Firm — Finnegan, Henderson, Farabow, Garrett & Dunner LLP (57) ABSTRACT A method is provided for automatic computer and user migration. The method may include obtaining a plurality of source computers with corresponding users and preparing the source computers such that at least one software image is created, based on a software inventory, for the source computers to be used to migrate the source computers and the users to a plurality of target computers. The method may also include installing the software image on the target computers and verifying operations of the target computers after the installation.

20 Claims, 6 Drawing Sheets

U.S. PATENT DOCUMENTS

| | | | | |
|---|---|---|---|---|
| 2002/0178233 | A1* | 11/2002 | Mastrianni et al. | 709/217 |
| 2003/0074386 | A1* | 4/2003 | Schmidt et al. | 709/1 |
| 2003/0167354 | A1 | 9/2003 | Peppers et al. | |
| 2003/0225927 | A1* | 12/2003 | Goodman et al. | 709/320 |
| 2004/0003387 | A1* | 1/2004 | Ballard et al. | 717/170 |
| 2004/0117759 | A1* | 6/2004 | Rippert et al. | 717/100 |
| 2004/0128515 | A1* | 7/2004 | Rabin et al. | 713/176 |
| 2004/0153640 | A1* | 8/2004 | Sugita et al. | 713/2 |
| 2004/0187104 | A1* | 9/2004 | Sardesai et al. | 717/174 |
| 2004/0199760 | A1* | 10/2004 | Mazza et al. | 713/150 |
| 2004/0268340 | A1* | 12/2004 | Steeb et al. | 717/174 |
| 2005/0027846 | A1* | 2/2005 | Wolfe et al. | 709/223 |
| 2005/0044415 | A1* | 2/2005 | Yook et al. | 713/201 |
| 2005/0086457 | A1* | 4/2005 | Hohman | 713/1 |
| 2005/0125509 | A1* | 6/2005 | Ramachandran | 709/220 |
| 2005/0125522 | A1* | 6/2005 | DelGaudio et al. | 709/223 |
| 2005/0262105 | A1* | 11/2005 | DelGaudio et al. | 707/10 |
| 2005/0273486 | A1* | 12/2005 | Keith, Jr. | 709/200 |
| 2005/0273488 | A1* | 12/2005 | Ryan et al. | 709/203 |
| 2005/0278432 | A1 | 12/2005 | Feinleib et al. | |
| 2005/0289533 | A1* | 12/2005 | Wang et al. | 717/168 |
| 2006/0026012 | A1* | 2/2006 | Campbell | 705/1 |
| 2006/0026195 | A1* | 2/2006 | Gu et al. | 707/102 |
| 2006/0026270 | A1 | 2/2006 | Sadovsky et al. | |
| 2006/0026587 | A1 | 2/2006 | Lemarroy et al. | |
| 2006/0048236 | A1* | 3/2006 | Multerer et al. | 726/28 |
| 2006/0064474 | A1 | 3/2006 | Feinleib et al. | |
| 2006/0130052 | A1 | 6/2006 | Allen et al. | |
| 2006/0184932 | A1* | 8/2006 | Burnley et al. | 717/174 |
| 2006/0190361 | A1* | 8/2006 | Greenbaum et al. | 705/28 |
| 2006/0277287 | A1* | 12/2006 | McCall et al. | 709/223 |
| 2006/0287959 | A1* | 12/2006 | Blecken | 705/59 |
| 2007/0006205 | A1* | 1/2007 | Kennedy et al. | 717/168 |
| 2007/0044085 | A1* | 2/2007 | Stamper et al. | 717/168 |
| 2007/0061386 | A1* | 3/2007 | Hancock et al. | 707/204 |
| 2007/0100892 | A1* | 5/2007 | Kephart et al. | 707/200 |
| 2007/0130423 | A1* | 6/2007 | Liu et al. | 711/114 |
| 2007/0220071 | A1* | 9/2007 | Anzai et al. | 707/204 |
| 2007/0226331 | A1* | 9/2007 | Srinivasan et al. | 709/223 |
| 2007/0234346 | A1* | 10/2007 | Kramer et al. | 717/174 |
| 2007/0239954 | A1* | 10/2007 | Sakashita et al. | 711/165 |
| 2007/0240151 | A1* | 10/2007 | Marl et al. | 717/174 |
| 2007/0245314 | A1* | 10/2007 | Carteri et al. | 717/124 |
| 2007/0250575 | A1* | 10/2007 | Tseitlin et al. | 709/205 |
| 2007/0256058 | A1* | 11/2007 | Marfatia et al. | 717/137 |
| 2007/0283346 | A1* | 12/2007 | Delgrosso et al. | 717/176 |
| 2008/0005787 | A1* | 1/2008 | Aldred | 726/4 |
| 2008/0021984 | A1* | 1/2008 | Zarenin et al. | 709/220 |
| 2008/0028390 | A1* | 1/2008 | Fors et al. | 717/174 |
| 2008/0034200 | A1* | 2/2008 | Polcha et al. | 713/153 |
| 2008/0040455 | A1* | 2/2008 | MacLeod et al. | 709/220 |
| 2008/0140844 | A1* | 6/2008 | Halpern | 709/226 |
| 2008/0162604 | A1* | 7/2008 | Soulet et al. | 707/204 |
| 2008/0209413 | A1* | 8/2008 | Kakumani et al. | 717/172 |
| 2008/0235225 | A1* | 9/2008 | Michele et al. | 707/6 |
| 2009/0307391 | A1* | 12/2009 | Yamamoto et al. | 710/36 |
| 2010/0325410 | A1* | 12/2010 | Fitzgerald et al. | 713/2 |
| 2011/0004629 | A1* | 1/2011 | Thorat et al. | 707/783 |

* cited by examiner

FIG. 6

METHOD AND SYSTEM FOR AUTOMATIC COMPUTER AND USER MIGRATION

TECHNICAL FIELD

This disclosure relates generally to computer installation and migration techniques and, more particularly, to automatic and unified computer migration technologies.

BACKGROUND

Modern personal computer (PC) systems are used in almost every business, education, and government organization around the world. These computer systems generally include operating systems and application software programs. An operating system provides system-wide management functions and an executing environment for application software programs, each of which performs a particular functionality.

The operating system and the application software programs of a personal computer are often configured according to a user's needs. Such configuration may be stored through a persistent mechanism, such as an on-disk file, so that when the computer is reset or restarted, the configuration settings can be read and the operating system or software applications can run with the stored settings. The user does not have to reconfigure the settings from scratch. However, when the personal computer is replaced or upgraded by another computer system, or when the operating system is changed from one to another, the application software programs and the configuration may be no longer usable and manual processes are often required to carry out such software program reinstallation and configuration for replacing or upgrading the personal computer. Further, when the number of the computers involved is large, which is often the case within a large organization, it may be time-consuming and even impractical to manage such reinstallation or upgrade due to the number of manual processes and operations.

Certain techniques have been developed to assist the user to migrate the configuration and other user information. For example, U.S. Patent Application Publication No. 2006/0026587 to Lemarroy et al. discloses a system and method that recognizes source and target devices and transfers user profiles, user settings, data, applications, and other information from the source device to the target device. However, such conventional techniques often fail to address issues with migrations in an enterprise environment involving a large number of computer devices and a large number of applications. Further, such conventional techniques often use many computer files and file transfers and fail to incorporate the migration process into enterprise asset management and/or inventory management systems.

Methods and systems consistent with certain features of the disclosed systems are directed to solving one or more of the problems set forth above.

SUMMARY OF THE INVENTION

One aspect of the present disclosure includes a method for automatic computer and user migration. The method may include obtaining a plurality of source computers with corresponding users and preparing the source computers such that at least one software image is created, based on a software inventory, for the source computers to be used to migrate the source computers and the users to a plurality of target computers. The method may also include installing the software image on the target computers and verifying operations of the target computers after the installation.

Another aspect of the present disclosure includes a computer system for automatic computer and user migration. The computer system may include a database and a processor. The database may be configured to include a single software image for migrating a plurality of source computers. The processor may be configured to obtain the plurality of source computers with corresponding users and to prepare the source computers such that the single software image is created for the source computers to be used to migrate the source computers and the users to a plurality of target computers. The processor may also be configured to install the single software image on the target computers and to verify operations of the target computers after the installation.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
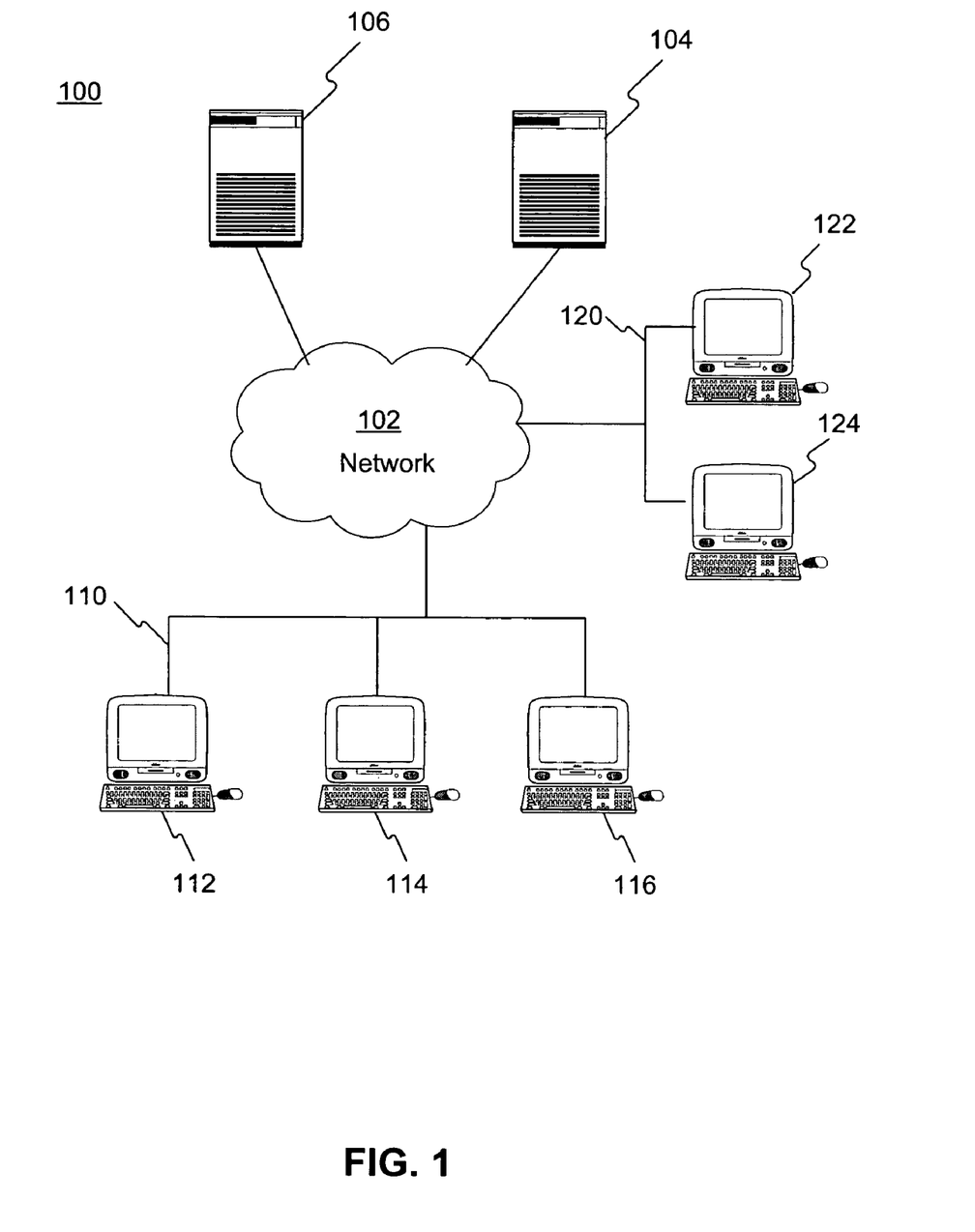
FIG. 1 illustrates a block diagram of an installation and migration environment consistent with certain disclosed embodiments.

FIG. 1 illustrates a block diagram of an installation and migration environment 100 incorporating certain disclosed embodiments. As shown in FIG. 1, the installation and migration environment 100 may include a network 102, a server 104, a third party computer 106, a first local network 110 including computers 112, 114, and 116, and a second local network 120 including computers 122 and 124. It is understood that the numbers and types of the devices are used for illustrative purposes. Other devices may be included and the numbers of the devices may be changed. Server 104, local networks 110 and 120, and computers 112, 114, 116, 122, and 124 may be a part of an enterprise entity's information infrastructure.

Network 102 may include any appropriate network or networks. For example, network 102 may include a wired network, wireless network, public network, private network, packet switched network, circuit-switched network, personal area network, local area network, wide area network, or any combination of networks such as the ubiquitous Internet. Network 102 may be used to enable communications among server 104, third party computer 106, and computers 112, 114, 116, 122, and 124.

First local network 110 and second local network 120 may represent local networks of the enterprise entity in multiple business locations, and each location may have its own local network. Computers 112, 114, 116, 122, and 124 include any appropriate computing device, such as a personal computer, server computer, workstation computer, laptop, palmtop, personal digital assistant ("PDA"), wireless communication device, cell phone, pager, or any other type of computing device.

The enterprise entity may require computers to be installed, moved, added, and/or changed (IMAC). For example, computer 112 may be installed in first local network 110; computer 114 may be moved from first local network 110 to second local network 120; new hardware or software may be added on computer 116; computer 122 may be changed from one type of operating system to another type of operating system; and/or computer 124 may be changed or upgraded, for example, from one version of operating system to another newer version of the same operating system (e.g., Windows 2000 to Windows XP, etc.). Such IMAC activities may be carried out by both the involved computers (e.g., computers 112, 114, 116, 122, or 124) and server 104.

Third party computer 106 may include any appropriate computer system outside the enterprise entity, such as one or more computers from a service provider to provide certain services to the enterprise entity, or from a vender to provide certain hardware or software products or licenses. Third party computer 106 may communicate with server 104 or any of computers 112, 114, 116, 122, and 124 via network 102.

Further, server 104 may include any appropriate computer system that provides various server functionalities to manage the IMAC activities. For example, the sever functionalities may include providing central databases, software asset management, system management server (SMS) services, inventory management, security management and other network and/or system management, etc. Server 104 may create various databases to manage computers within the enterprise entity.

Figure 2:
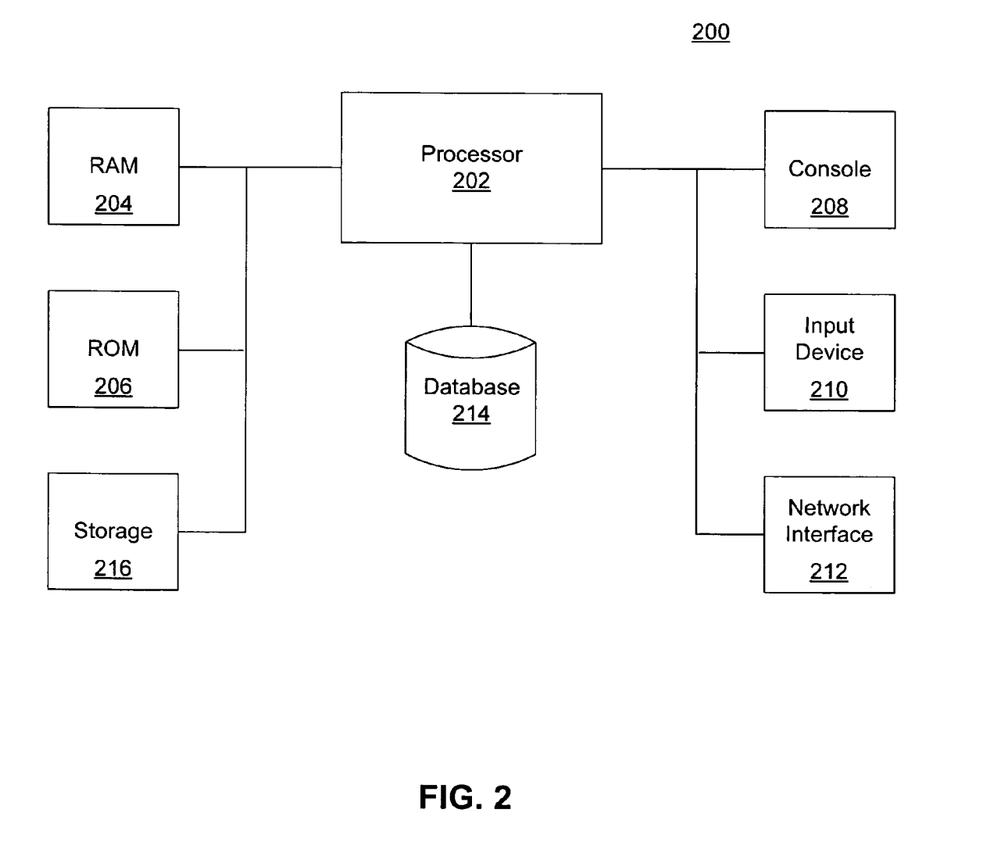
FIG. 2 illustrates a block diagram of a computer system consistent with certain disclosed embodiments.

For example, server 104 may track deployment and use of software assets and plan software procurement and licensing. Server 104 may also maintain inventories of computer hardware and software to manage the population of the computers and to manage computers that roam from one location to another and connect to the network from different geographical locations. Further, server 104 may include various databases to store software releases or software packages, such as active directory, etc. In certain embodiments, server 104 may include multiple computer systems, and each may provide a particular functionality or may perform similar functionalities based on load-balancing techniques. FIG. 2 shows a functional block diagram of an exemplary computer system 200 that may implement server 104 to be used to perform these processes and operations.

As shown in FIG. 2, computer system 200 may include a processor 202, a random access memory (RAM) 204, a read-only memory (ROM) 206, a console 208, an input device 210, a network interface 212, a database 214, and a storage 216. It is understood that the type and number of listed devices are exemplary only and not intended to be limiting. The number of listed devices may be changed and other devices may be added.

Processor 202 may include any appropriate type of general purpose microprocessor, digital signal processor, or microcontroller. Processor 202 may execute sequences of computer program instructions to perform various processes as explained above. Processor 202 may be coupled to or access other devices, such as RAM 204, ROM 206, console 208, input device 210, network interface 212, database 214, and/or storage 216, to complete execution of computer program instructions. The computer program instructions may be loaded into RAM 204 for execution by processor 202 from read-only memory (ROM) 206, or from storage 216. Storage 216 may include any appropriate type of mass storage provided to store any type of information that processor 202 may need to perform the processes. For example, storage 216 may include one or more floppy disk devices, hard disk devices, optical disk devices, or other storage devices to provide storage space.

Console 208 may provide a graphic user interface (GUI) to display information to users of computer system 200. Console 208 may include any appropriate type of computer display device or computer monitor. Input device 210 may be provided for users to input information into computer system 200. Input device 210 may include a keyboard, a mouse, or other optical or wireless computer input device, etc. Further, network interface 212 may provide communication connections such that computer system 200 may be accessed remotely through computer networks via various communication protocols, such as transmission control protocol/internet protocol (TCP/IP), hyper text transfer protocol (HTTP), etc.

Database 214 may include various databases related to computer installation and migration applications and/or any information used by processor 202. Database 214 may include any type of commercial or customized database. Database 214 may also include analysis tools for analyzing the information in the database. Processor 202 may also use database 214 to determine and store performance characteristics of computer system 200. Although computer system 200 is shown to implement server 104, it is exemplary and not intended to be limiting. Computer system 200 may also be implemented as third party computer 106 or any of computers 112, 114, 116, 122, and 124.

Processor 202 may execute a migration process to handle certain IMAC activities of a large number of computers. As used herein, migration may refer to a process of moving or updating a source computer along with its software installations to a target computer and/or moving a user of the source computer with certain user configuration and user data to a target computer. The source computer may be migrated to a target computer; the user may be migrated from the source computer to the target computer; or the source computer and its user or users may be migrated to the target computer. The source computer and target computer (e.g., any of computers 112, 114, 116, 122, and 124) may include any appropriate computer inside the enterprise entity.

Figure 3:
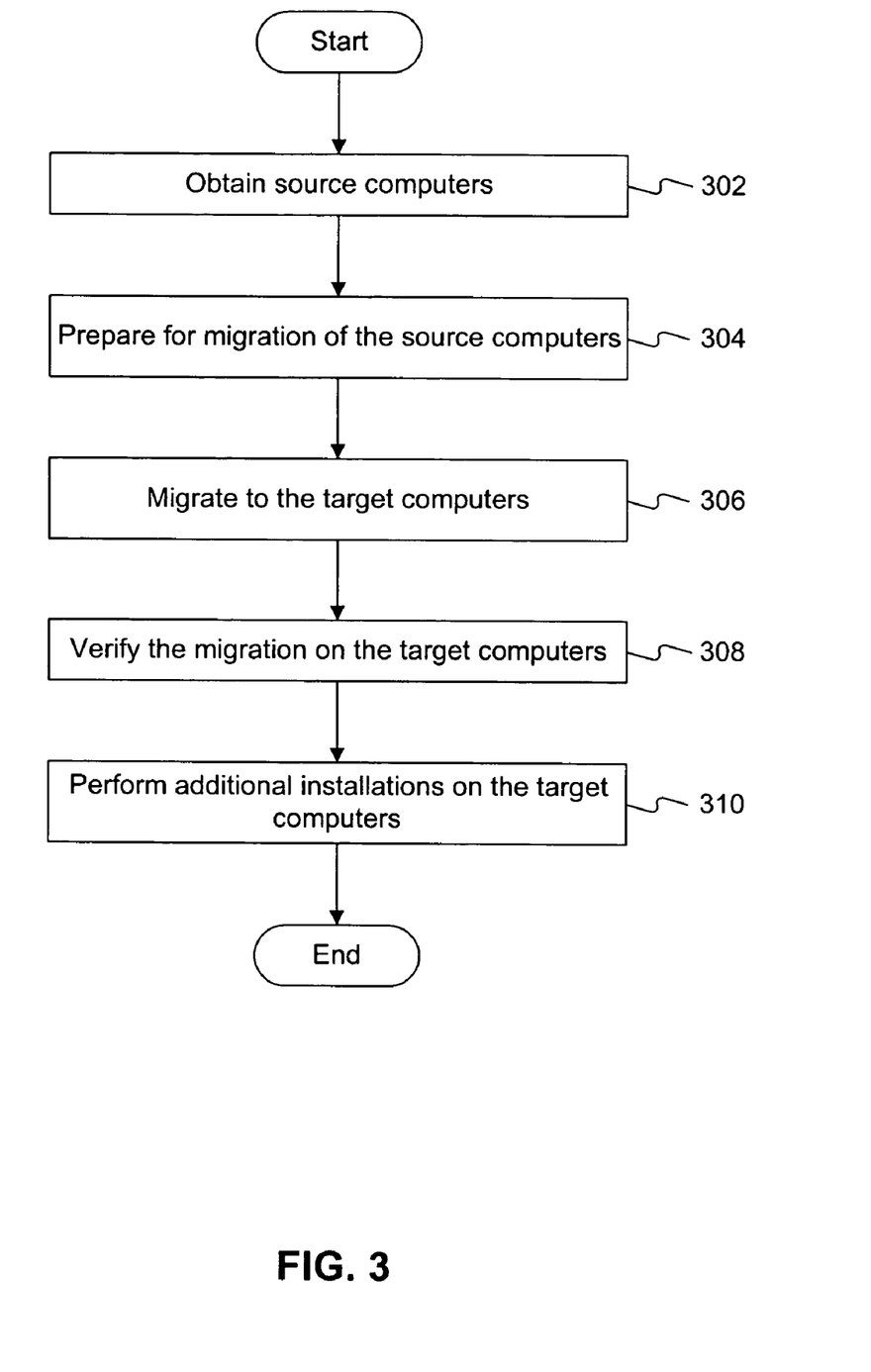
FIG. 3 illustrates a flowchart of an exemplary migration process consistent with certain disclosed embodiments.

In certain embodiments, the target computer may be a different computer system with more advanced hardware components or a later version operating system than that of the source computer. In certain other embodiments, the target computer may be the same computer as the source computer but with an upgrade or upgrades to the computer hardware, operating system, or both. Processor 202 may perform the migration process to automatically identify software applications on a source computer and to reinstall the software applications on a target computer based upon the user's configuration when the user moves from the source computer to the target computer. FIG. 3 shows an exemplary user migration process consistent with certain disclosed embodiments.

As shown in FIG. 3, server 104, more specifically processor 202 of server 104, may obtain a plurality of source computers to be migrated (step 302). Corresponding users may also be migrated from the source computers to target computers. Processor 202 may obtain the source computers by detecting source computers using any appropriate detection method via network 102. Processor 202 may also obtain the source computers from other computer systems or databases. Further, processor 202 may obtain the source computers based on inputs from a user of server 104. In addition, a time schedule for migration of an individual source computer may also be obtained by processor 202, along with the identification of the individual source computer.

Figure 4:
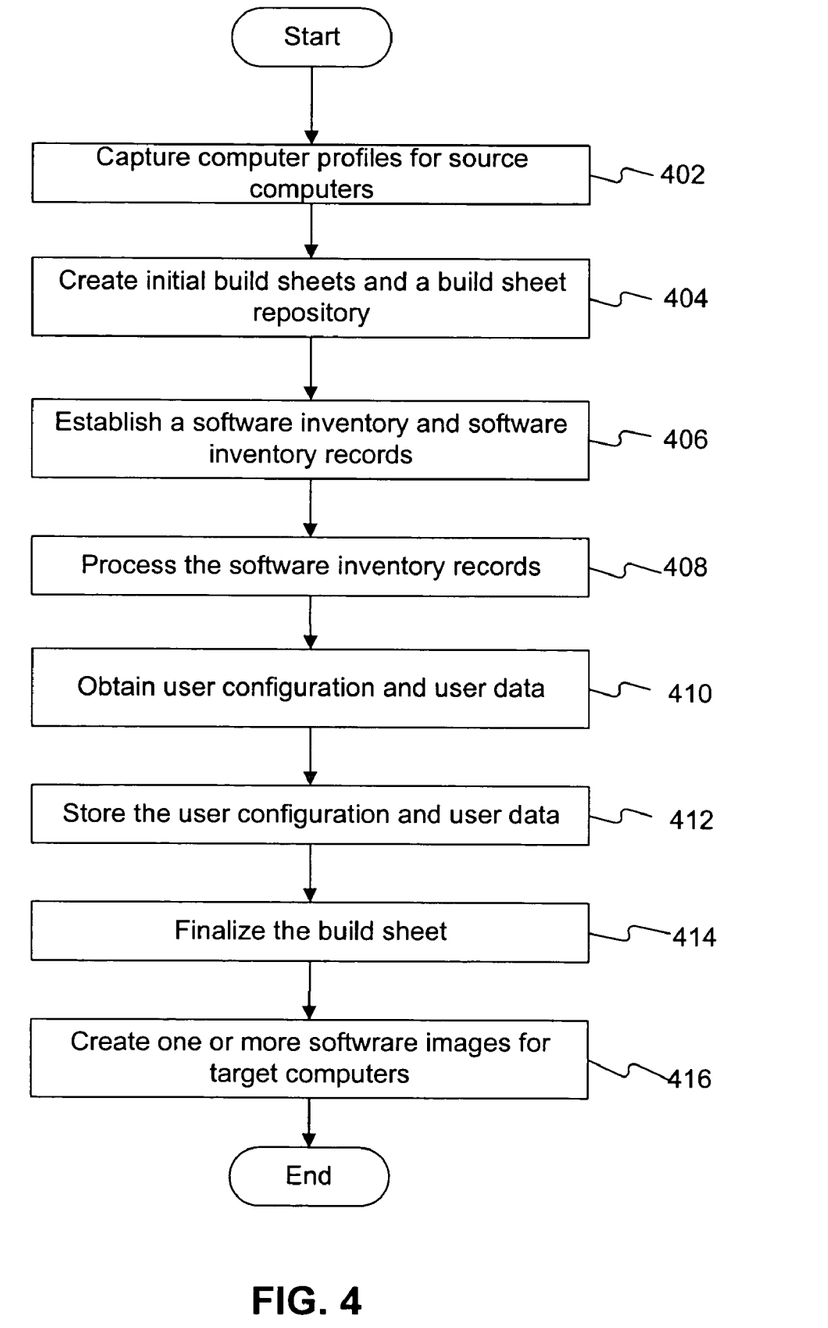
FIG. 4 shows a flowchart of an exemplary preparation process consistent with certain disclosed embodiments.

After obtaining the source computers (step 302), processor 202 may prepare the source computers for migration operations (step 304). FIG. 4 shows an exemplary preparation process performed by processor 202 consistent with certain disclosed embodiments.

As shown in FIG. 4, at the beginning of the preparation process, processor 202 may capture a machine profile for each individual source computer (step 402). The machine profile may include any appropriate information about the individual source computer, such as information about hardware, software, and/or users of the source computer. For example, the machine profile may include information about memory, hard disks, processors, manufacture ID (e.g., serial number, service tag, etc.), network devices, other peripherals, and location of the source computer. The machine profile may also include information about the operating system, such as the configuration and version of the operating system, serial number and license number of the operating system, etc., of the source computer.

Further, the machine profile may include information about software applications (i.e., software programs that are executed based on the operating system), such as type, name, version number, manufacturer, serial number and/or license number, etc., and information about usage of the software applications, such as related services and/or related processes, etc., of the source computer. The machine profile may also include user information such as user identification, user account and password, user configuration and user data that are maintained on the source computer.

Processor 202 may capture the machine profile of an individual source computer automatically by sending requests to the individual source computer or by extracting the required information with certain administration tools, such as network management tools and/or inventory scanning tools, etc. Processor 202 may also obtain the machine profile from other computer systems or databases or from inputs from the user of server 104. After capturing the machine profile (step 402), processor 202 may create an initial build sheet for each individual source computer and a build sheet repository for the source computers (step 404).

A build sheet may include a checklist representing a variety of software applications with corresponding installation information, such as the name of the product, serial number, version, file size, file date, file path, and executable or setup file location, etc. In certain embodiments, processor 202 may also create a standard build sheet based on information from the machine profile, such as location and type of the source computer, etc. Such a standard build sheet may be used for all the source computers to be migrated at one time. Alternatively, the individual source computer or the user of the source computer may create its own build sheet or modify its corresponding build sheet created by processor 202. Processor 202 may treat a build sheet created by the individual source computer or the user of the source computer as the initial build sheet without creating a new one.

Processor 202 may also establish a software inventory and generate associated software records in the software inventory for the source computers (step 406). As used herein, the software inventory may refer to all information about all the files from source computers' disk drives, including both physical drives (e.g., local drives) and logical drives (e.g., network drives or shared drives). Processor 202 may establish a software inventory for each individual source computer or may establish a unified software inventory for the source computers. Processor 202 may establish the software inventory by using any appropriate software inventory tool, such as Microsoft inventory tools, etc.

Software records, as used herein, may refer to data records in a data structure that record a current configuration state of a source computer (e.g., computer software installed, user of the machine, user-defined configuration settings, security technical controls, etc.); a current status of all e-mail communications reflecting migrating status; and computer identification fields (e.g., computer name, user name, physical location, various status codes reflecting ability to migrate, etc.). Each software record of the software inventory may represent a particular software application. Further, each of the software records in the software inventory may include a software status flag.

The software status flag may indicate the status of the corresponding software application and may be used to indicate certain actions to, be taken during the migration process. The software status flag may include values of "Unknown", "No Install", "Green", "License Needed", and "License Pending", etc. The status "Unknown" may indicate that the software application is not known; the status "No Install" may indicate that the software application should not be installed; the status "Green" may indicate a normal software application that is ready to be installed; the status "License Needed" may indicate that the software application cannot be installed because there is no required license; and status "License Pending" may indicate that the software application is in the process of acquiring the required license and may be installed at a later time. The specific phrases used herein are for exemplary only, and any appropriate phrases may be used.

Figure 5:
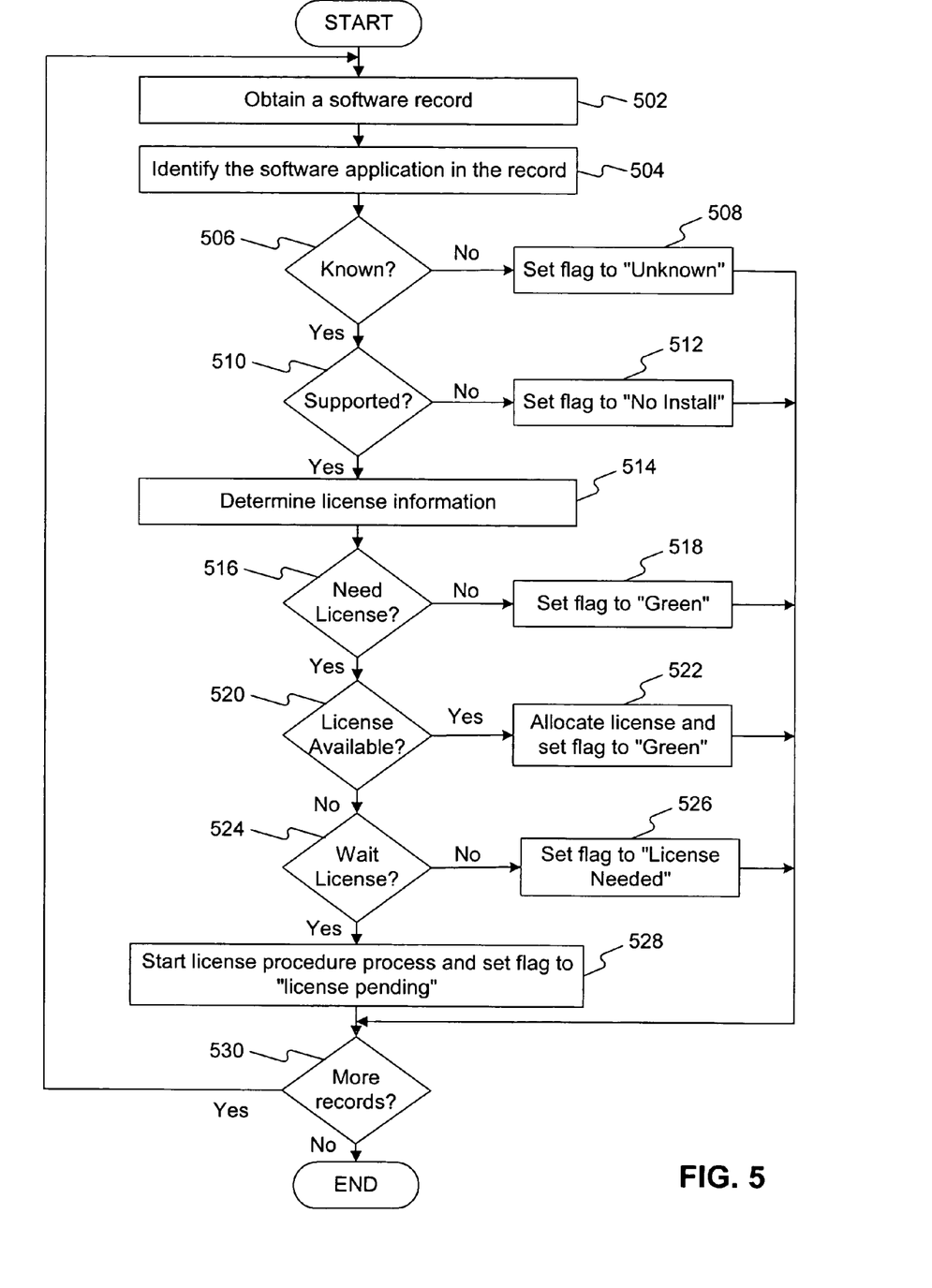
FIG. 5 shows a flowchart of an exemplary validity checking process consistent with certain disclosed embodiments.

After establishing the software inventory including all the software records (step 406), processor 202 may process the software records from the software inventory to perform a validity check on the software application programs represented by the software records (step 408). FIG. 5 shows an exemplary validity checking process consistent with certain disclosed embodiments.

As shown in FIG. 5, at the beginning of the validity checking process, processor 202 may obtain a software record from the software inventory (step 502). Based on the software record, processor 202 may also identify the software application in the software record (step 504). Further, processor 202 may determine whether the software application identified is a known application (step 506). A known application may refer to a software application whose use is authorized, supported, and/or permitted by the enterprise entity according to its information technology (IT) policy. If the software application is not a known application (step 506; no), processor 202 may set the software status flag to "Unknown" (step 508).

On the other hand, if the software application is a known application (step 506; yes), processor 202 may further determine whether the software application is supported on the target computer (step 510). As explained in previously sections, a target computer may be the same computer as the source computer. However, the target computer may include new hardware components (e.g., processors, etc.) and/or a different version of operating system (e.g., Windows XP operating system vs. Windows 2000 operating system). The software application may be supported on the target computer if the software application can be executed properly with the new hardware components and/or under the different version of operating system.

If processor 202 determines that the software application is not supported on the target computer (step 510; no); processor 202 may set the software status flag to "No Install" (step 512). On the other hand, if processor 202 determines that the software application is supported on the target computer (step 510; yes), processor 202 may determine license information associated with the software application (step 514). Based on the license information, processor 202 may determine whether a license is need for the software application (step 516).

If processor 202 determines that the software application does not need a license (step 516; no), processor 202 may set the software status flag to "Green" (step 518). However, if processor 202 determines that the software application requires a license (step 516; yes), processor 202 may determine whether the required license is available (step 520). Processor 202 may inquire an asset management database to determine whether a license is available for the software application. An asset management database may refer to one or more database and systems managed by server 104 or other computer systems to maintain certain asset data including location, usage, and cost history of the software assets (e.g., purchased or licensed software applications).

If processor 202 determines that a license is available (step 520; yes), processor 202 may set the software status flag to "Green" (step 522). On the other hand, if a license is not available (step 520; no), processor 202 may further determine whether to wait for a license becoming available (step 524). If processor 202 determines not to wait for an available license (step 524; no), processor 202 may set the software status flag to "License Needed" (step 526).

On the other hand, if processor 202 determines to wait for an available license (step 524; yes), processor 202 may set the software status flag to "License Pending" and may also start a license procure process (step 528). Processor 202 may initiate the license procure process, along with other systems such as the asset management database and systems, to prepare purchase order, to get approval, and to order and receive the required software license. For example, processor 202 may procure the license from third party computer 106 via network 102. After receiving the required license, processor 202 may update a license pool database and/or the asset management database to indicated the newly acquired software license. Further, processor 202 may update the software status flag to "Green" or may initiate an installation process directly to install the licensed software program.

After starting the license procure process (step 528), processor 202 may determine whether more software records from the software inventory need to be processed (step 530). If more software records need to be processed (step 530; yes), processor 202 may repeat the validity checking process for the software programs associated with the next software record at step 502. However, if no more software record needs to be processed (step 530; no), processor 202 may complete the validity checking process.

Returning to FIG. 4, after processing the software records (step 408), processor 202 may obtain user configuration and user data on individual source computers (step 410). User configuration may refer to any software settings used by the user to configure any software program or operating system on the corresponding source computer. User data may refer to any data generated and/or stored on any disk drive (e.g., local drives, network drives, or shared drives, etc.) of the source computer. The user configuration and user data may be used to customize the source computer and software programs on the source computer.

Processor 202 may make a backup file to include the user configuration and user data (step 412). Alternatively, if processor 202 determines that the user configuration and user data on the source computer are stored in a shared network drive and accessible by target computers, processor 202 may treat the file containing the user configuration and user data as the backup file. During backup, processor 202 may also determine that certain user data or user files are not desired to be stored in the backup file or files, such as MP3 files, etc.

Further, processor 202 may finalize the build sheet for individual source computers (step 414). Processor 202 may update the build sheet to reflect results from the validity checking process and/or from inputs by the user of server 104. For example, processor 202 may remove a software program from the build sheet if the software status flag relating to the software program is "No Install", "Unknown", or "License Needed". Processor 202 may also add a software program if the software status flag is "Green" and the build sheet does not include the software program. Further, the user may also edit the build sheet to add or remove software programs based on predetermined criteria. Optionally, processor 202 may also finalize the schedule for migrating the individual source computers. Optionally, processor 202 may finalize the build sheet based on predetermined enterprise-wide standard such that software programs listed on the build sheets of a large number of source computers are identical.

Processor 202 may also create one or more software images for the migrating source computers (step 416). The term "software image," as used herein, may refer to any appropriate computer software program or any combination of computer software programs. The software image may include all software programs of a particular source computer. The software image may also include common software programs for all migrating source computers (e.g., an operating system, computer software drivers, application software programs, and/or software utilities, etc.).

Processor 202 may create a single software image including operating system and all software programs listed on the finalized build sheet if a single build sheet is used for the source computers. Further, if the software programs listed on individual build sheets of the source computers are identical, a single software image may also be used for the source computers. On the other hand, if multiple build sheets are used, multiple software images may be created. Alternatively, processor 202 may create a small number of software images to include the operating system and a superset of software programs available within the enterprise entity, from which the individual source and/or target computer may install according to corresponding individual build sheet.

Processor 202 may create the single software image by using any appropriate software packaging tool. Because the operating system and various software application programs are included in a single software image (e.g., a single computer file), the sequence for extracting the operating system and software programs may be important and may be predetermined based on certain criteria, such as software dependencies. Processor 202 may also include multiple language support for the single software image during the creation and/or packaging processing of the software image. Further, processor 202 may also compress the software image using any appropriate compression technology to save storage space and loading time related to the software image.

Figure 6:
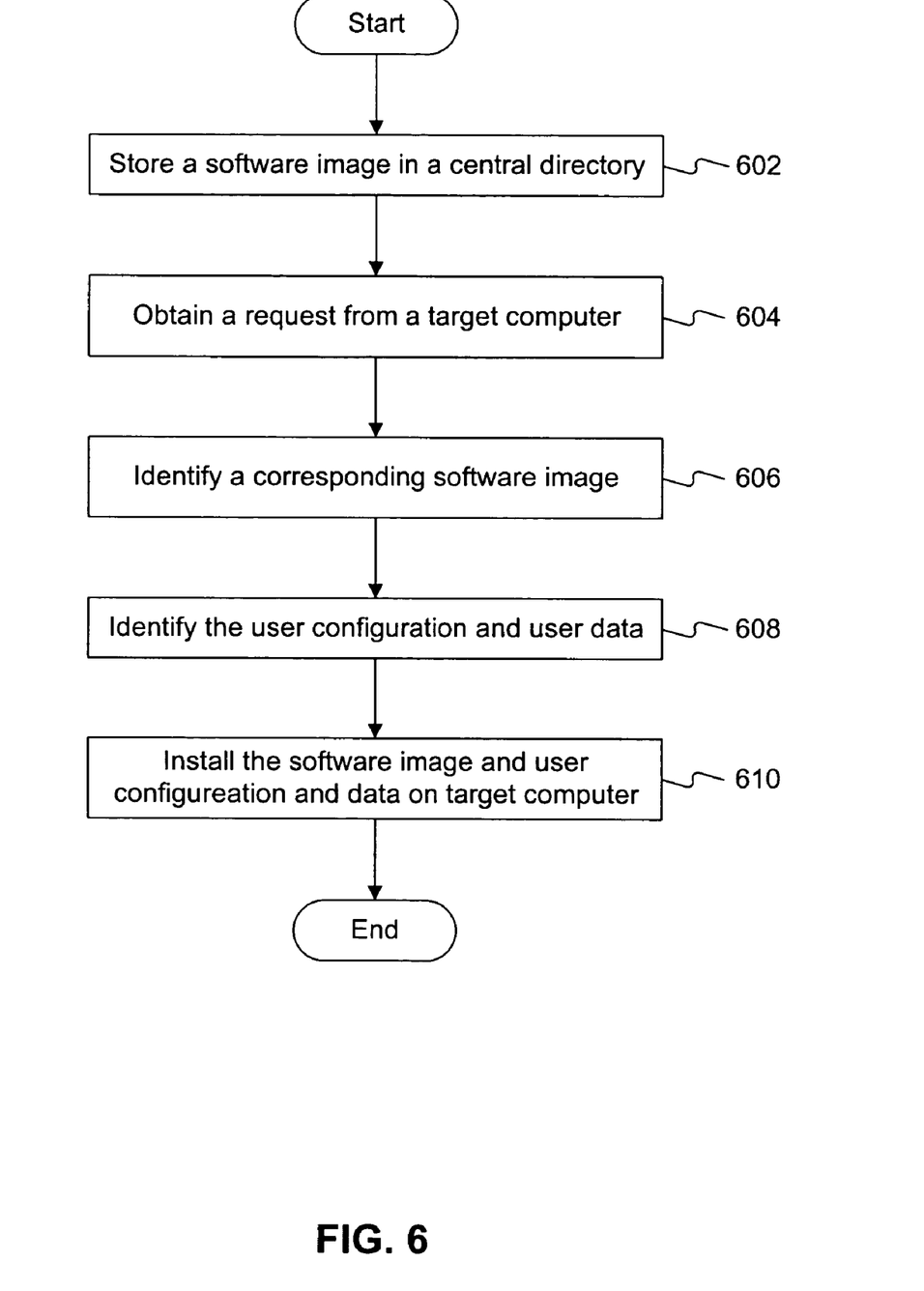
FIG. 6 shows a flowchart of an exemplary reinstallation process consistent with certain disclosed embodiments.

Returning to FIG. 3, after preparing for migration of the source computer (step 304), processor 202 may migrate individual source computers and corresponding users to respective target computers (step 306). Processor 202 may perform a reinstallation process to migrate the sources computers and users to target computers. FIG. 6 shows an exemplary reinstallation process consistent with certain disclosed embodiments.

As shown in FIG. 6, processor 202 may store the single software image or multiple software images in a central directory (step 602). Alternatively, processor 202 may also create a compact disk containing installable software image or images for migrating computers that may not be connected by network 102 or may be undesired to be connected to network 102. If a single software image is used, processor 202 may store the single software image in the central directory for all target computers. If multiple software images are used, processor 202 may also store the multiple software images in the central directory. Optionally, processor 202 may also store the finalized build sheets in the central directory or in the build sheet repository. As used herein, the central directory may include any appropriate database or directory, such as active directory, etc.

Further, processor 202 may obtain a reinstallation request from an individual target computer (step 604). The reinstallation request may be generated by individual target computer when the target computer starts up or when the migration schedule time arrives. After receiving the request, processor 202 may identify the target computer and its corresponding user, and may further identify a corresponding software image for the target computer (step 606). Processor 202 may also identify stored user configuration and user data for the corresponding user (step 608).

Processor 202 may then perform certain required actions to install the identified software image on the target computer (step 610). For example, processor 202 may perform certain security checks with the target computer, such as certifying the software image, encrypting or decrypting communications between the target computer and server 104, and/or authenticating the target computer, etc. Processor 202 may also facilitate the target computer to download the software image from the central directory.

Further, processor 202 may also facilitate the target computer to download the file containing the user configuration and user data. For example, processor 202 may send the target computer the location of the file, or may copy the file and load the file to the target computer. As explained above, if any security procedure is required for the target computer to communicate with server 104, the target computer may perform such procedure. After the target computer gets both the software image and the user configuration and user data, target computer may start extracting software programs from the software image and executing or setting up the software programs in a predetermined sequence. For example, the target computer may extract operating system and set up the operating system such that other software application programs may be extracted and set up.

When extracting or setting up the software programs, the target computer may use the user configuration and user data to set up the software programs according to the user configuration and user data such that the software programs on the target computer may have the same "look and feel" (e.g., same appearance, functionalities, and/or customization, etc.) as that of the source computer. In addition, the target computer may also decompress the software image if any part of the software image is compressed.

Further, if a single image and/or a single build sheet is used, the target computers may install all software programs included in the software image. On the other hand, if individual build sheets are used by the target computers, an individual target computer may install only the software programs identified in corresponding build sheet.

Returning to FIG. 3, after the completion of the reinstallation process (step 306), processor 202 may verify the user migration results on target computers (step 308). Processor 202 may automatically verify the user migration with the individual target computers through certain protocols and/or network management tools. Processor 202 may also verify the user migration by notifying the users of the target computers and obtaining inputs from the users. For example, processor 202 may obtain confirmations from the users of the target computer that the user migration is successful. Processor 202 may also send a notification message to or cause a notification message to be displayed on a migrated target computer to notify the user of the target computer of completion of both computer and user migration. However, if processor 202 cannot verify the user migration results either automatically with the target computer or interactively with the users, processor 202 may open trouble tickets and may further assign such tickets to a proper help desk across the enterprise entity.

After verifying the user migration results (step 308), processor 202 may perform any additional installation on target computers (step 310). The additional installation may be performed on certain particular target computer based on certain predetermined criteria or be requested by one or more particular users of a target computer. For example, the user may request additional installation on training programs, trouble shooting programs, and/or additional software programs or newly acquired software programs, etc.

Industrial Applicability

The disclosed systems and methods may provide efficient solutions to integrate desktop computer installation, move, addition, and change activities within a large business organization into enterprise asset management and active directory and enable automatic installation and configuration of operating system and all software applications based on pre-existing user configuration. When a large number of new desktop computers replace old desktop computers, or when a large number of desktop computers are upgraded, the disclosed systems and methods may enable these desktop computers to know what to load, what license to use, how to load, and how to configure without manual operations. Such automatic processes may significantly reduce the amount of time and cost associated with such migration process in an enterprise environment.

The disclosed systems and methods may also integrate different commercial tools into a unified information infrastructure to achieve automatic computer and user migration. For example, the disclosed system and methods may include tools such as software inventory tools, software asset management tools, system management server (SMS) tools, active directory, etc., and may use them in the automated migration processes.

The disclosed systems and methods may also be used by business organizations to implement low-cost and fast computer and/or user migration processes. Further, the disclosed systems and methods may be used by computer manufacturers and software application vendors to incorporate automatic installation and configuration into the computers and/or software applications.

Other embodiments, features, aspects, and principles of the disclosed exemplary systems will be apparent to those skilled in the art and may be implemented in various environments and systems.

What is claimed is:

1. A method for automatic computer and user migration, comprising:
   selecting a plurality of source computers and a plurality of target computers for migration;
   preparing each source computer of the plurality of source computers for migration, wherein the preparation includes:
   establishing an inventory of software applications present in a source computer;
   identifying a set of licensed and authorized software applications from the established inventory of software applications present in the source computer;
   creating a software image of the source computer, the software image indicating at least the identified set of software applications, and user preferences for configuring the identified software applications;

installing the created software image on a target computer of the plurality of target computers; and verifying operations of the target computer after the installation.

2. The method according to claim 1, further including sending a notification message to a user of the target computer indicating completion of the computer and user migration.

3. The method according to claim 1, wherein the preparing further includes:

capturing computer profiles of the plurality of source computers; and creating build sheets for the plurality of source computers and a build sheet repository based on the build sheets.

4. The method according to claim 3, wherein creating the software image includes setting one or more software status flags indicating actions to be taken during the creation of the software image.

5. The method according to claim 4, wherein at least one software status flag of the one or more software status flags is one of "Unknown", "No Install", "Green", "License Needed", and "License Pending".

6. The method according to claim 5, wherein the installing includes installing the software image based on the software status flags.

7. The method according to claim 6, wherein the creation of the software image further includes:

determining if a software application present in the source computer is a recognized software application by an enterprise entity that operates the plurality of source computers; and setting the at least one software status flag to "Unknown" if the software application is not a recognized software application.

8. The method according to claim 1, wherein installing the created software image includes determining whether a software application in the software image is supported by the target computer.

9. The method according to claim 5, wherein identifying the set of licensed and authorized software includes determining license information of a software application of the inventory of software applications in the source computer;

determining whether the software application needs a license; and setting the at least one software status flag to "Green" if the software application does not need a license.

10. The method according to claim 9, further including:

determining whether the license is available if the software application needs a license;

allocating the license if the license is available; and setting the at least one software status flag to "Green".

11. The method according to claim 10, further including:

determining whether to wait for the license if the license is not available; and setting the at least one software status flag to "License Needed" if it is determined not to wait for the license.

12. The method according to claim 11, further including:

starting a process to procure a license if it is determined to wait for the license; and setting the at least one software status flag to "License Pending".

13. The method according to claim 1, wherein the preparation of each source computer further includes:

obtaining user configuration and user data for the users of the source computer; and storing the user configuration and user data on shared drives accessible by the target computer.

14. A method for migrating computers of an organization, comprising:

identifying a plurality of source computers to migrate data from;

identifying a plurality of target computers to migrate data to;

identifying a set of licensed and authorized software applications in each source computer of the plurality of source computers;

storing a software image of each source computer on a remote computer, the software image including an indication of the identified set of licensed and authorized software applications present in the source computer, and user preferences for configuring the software applications;

receiving a request for migration, the request originating from a target computer of the plurality of target computers;

determining whether each software application in the software image is supported by the target computer; and installing the software image on the target computer.

15. The method of claim 14, wherein identifying the set of licensed and authorized software applications include checking to determine if a software application present in the source computer is licensed.

16. The method of claim 15, wherein the identifying further includes starting a process to procure a license if the checking indicates that the software application is not licensed.

17. The method of claim 14, wherein identifying the set of licensed and authorized software applications includes checking to determine if a software application present in the source computer is authorized to be used in the source computer.

18. A computer based system for automatic migration of computers, comprising:

a memory of the computer configured to store information regarding a plurality of source computers to migrate data from, and a plurality of target computers to migrate data to; and a processor of the computer, configured to:

establish an inventory of software applications present in each source computer;

determine if each software application in the inventory of a source computer is licensed and authorized to be present in the source computer;

identify a set of software applications in the source computer that are licensed and authorized;

store a software image in the database, the software image being an indication of the identified set of software applications present in the source computer, and user preferences for configuring the software applications;

receive a request for migration, the request originating from a target computer of the plurality of target computers; and install the software image in the target computer.

19. The system of claim 18, wherein the processor is further configured to initiate a process to procure a license if the determination indicates that a software application is not licensed.

20. The system of claim 18, wherein the processor is further configured to send a notification message to a user of the target computer after the installation.

* * * * *